Patented May 16, 1933

1,909,865

UNITED STATES PATENT OFFICE

RICHARD MEYER AND JOSEF SCHÄFER, OF BASEL, SWITZERLAND, ASSIGNORS TO J. R. GEIGY S. A., OF BASEL, SWITZERLAND

REMOVING IRON FROM SOLUTIONS OF CHROMIUM SALTS

No Drawing. Application filed November 29, 1932, Serial No. 644,915, and in Germany December 29, 1931.

Various proposals have been made for manufacturing chromium salts, which are extensively used in the leather industry, from parent materials containing iron by a process which is suitable for commercial application and avoids the costly intermediate production of bichromate; it has not been possible, however, to obtain by such processes salts which are completely free from iron. In fact the best process at present known, namely the preparation of chrome alum from ferrochrome, leads to products containing more or less iron. The presence of iron, however, is frequently objectionable in chrome tanning, particularly when it is a question of brightening chrome leather with the aid of synthetic tanning agents.

By the present invention the iron, in so far as it is present in the divalent state, can be quantitatively removed in a simple manner from solutions of chromium salts containing iron by treating the solution with $\beta$-naphthalene-sulphonic acid or with a soluble salt thereof, such as the sodium salt. Any ferric salt present in the solution must first be reduced to the ferrous state. The iron is thus removed in the form of the insoluble ferrous salt of $\beta$-naphthalene-sulphonic acid.

Since soluble salts of $\beta$-naphthalene-sulphonic acid can be used instead of the free acid it is possible to convert the insoluble ferrous salt obtained in the process into a soluble alkali salt of $\beta$-naphthalene-sulphonic acid by treatment with an alkali carbonate and to return the alkali salt to the process.

The following example illustrates the invention, the parts being by weight:—

200 parts of ferrochrome are introduced at 80° C. into a mixture of 500 parts of sulphuric acid of 93 per cent strength and 500 parts of water. The whole is heated for about 5 hours at 110° C., then made up with water to 1600 parts and then left to crystallize. After standing for 48 hours the ferrous sulphate which has separated is removed by filtering. There are obtained 1450 parts of a chromium solution containing 337 parts of combined acid, 65 parts of free acid, 150 parts of chromium oxide and 47 parts of ferric oxide, the iron being present in the solution in the divalent form.

The solution is brought to boiling and there is added a solution of 256 parts of $\beta$-naphthalene-sulphonic acid of 100 per cent strength in 3 times the quantity of water. On cooling the iron is precipitated quantitatively in the form of the ferrous salt of $\beta$-naphthalene-sulphonic acid. After filtering and adjusting the filtrate to the desired basicity there is obtained a chromium solution which is free from iron and is ready for use in tanning.

If there is used as parent material a chromium slime containing iron instead of ferrochrome the procedure is as above described with the exception that after the parent material has been dissolved in sulphuric acid the ferric sulphate in the solution is reduced to the ferrous salt according to known methods.

What we claim is:—

1. A process for removing iron from acid solutions of chromium salts, consisting in treating the iron containing solution at a raised temperature with a small excess of $\beta$-naphthalene-sulphonic acid and separating the formed precipitate from the liquid after cooling.

2. A process for removing iron from acid solutions of chromium salts, consisting in adding to the iron containing solution at a raised temperature a soluble salt of $\beta$-naphthalene-sulphonic acid to split off $\beta$-naphthalene-sulphonic acid for reacting with the solution and separating the formed precipitate from the liquid after cooling.

3. A process for removing iron from acid solutions of chromium salts, consisting in first reducing in the iron containing solution any ferric salt to the ferrous state, then treating the solution at a raised temperature with a small excess of $\beta$-naphthalene-sulphonic acid and separating the formed precipitate from the liquid after cooling.

In witness whereof we have hereunto signed our names this 18th day of November 1932.

RICHARD MEYER.
JOSEF SCHÄFER.